US006747566B2

(12) United States Patent
Hou

(10) Patent No.: US 6,747,566 B2
(45) Date of Patent: Jun. 8, 2004

(54) VOICE-ACTIVATED REMOTE CONTROL UNIT FOR MULTIPLE ELECTRICAL APPARATUSES

(76) Inventor: Shaw-Yuan Hou, 4F-1, No. 34 Chu Luen St., Taipei (TW)

( * ) Notice: Subject to any disclaimer, the term of this patent is extended or adjusted under 35 U.S.C. 154(b) by 445 days.

(21) Appl. No.: 09/802,939

(22) Filed: Mar. 12, 2001

(65) Prior Publication Data

US 2002/0126035 A1 Sep. 12, 2002

(51) Int. Cl.[7] ......................... G08C 19/00; H04B 10/00

(52) U.S. Cl. ............................ 340/825.69; 340/825.72; 398/106

(58) Field of Search ....................... 340/825.69, 825.72; 367/198; 398/106, 127; 381/77

(56) References Cited

U.S. PATENT DOCUMENTS 5,243,430 A * 9/1993 Emmons ..................... 348/734
5,267,323 A * 11/1993 Kimura ...................... 381/110
5,359,448 A * 10/1994 Laszlo et al. ............... 398/130
5,455,570 A * 10/1995 Cook et al. ............ 340/825.22
5,526,161 A * 6/1996 Suzuki et al. ............... 398/118
5,548,654 A * 8/1996 Fast ............................ 381/77
5,805,672 A * 9/1998 Barkat et al. ............ 379/88.03
5,917,630 A * 6/1999 Kadowaki et al. .......... 398/130
6,396,612 B1 * 5/2002 Bjorndahl ................... 398/121

FOREIGN PATENT DOCUMENTS

GB 2220290 * 4/1990

* cited by examiner

*Primary Examiner*—Michael Horabik
*Assistant Examiner*—Scott Au
(74) *Attorney, Agent, or Firm*—Troxell Law Office PLLC

(57) ABSTRACT

A voice-activated remote control unit which is adapted for use with one or more electrical apparatuses, such as a TV set, a DVD player, a stereo system, an air conditioner, for the purpose of allowing the user to remotely turn on/off and control the operations of these electrical apparatuses through voice-activation. The voice-activated remote control unit comprises voice input means which can pick up the user/s natural voice command and converting it into an digital voice signal. A command code database is used for storing a predefined set of remote-control command codes and corresponding voice commands; and a voice recognition unit is used to perform a voice recognition algorithm on the digital voice signal to thereby recognize the user's voice command, and which is further capable of retrieving the corresponding remote-control command code from the command code database. Finally, a wireless signal emitter, such as infrared (IR) signal emitter is used to modulate the retrieved remote-control command code into an IR signal and emitting the IR signal to the electrical apparatuses to cause one or more of the electrical apparatuses to operate accordingly.

1 Claim, 2 Drawing Sheets

VOICE-ACTIVATED REMOTE CONTROL UNIT FOR MULTIPLE ELECTRICAL APPARATUSES

BACKGROUND OF THE INVENTION

1. Field of the Invention

This invention relates to a voice-activated remote control unit which is adapted for use with one or more electrical apparatuses, such as a TV set, a DVD player, a stereo system, an air conditioner, for the purpose of allowing the user to remotely turn on/off and control the operations of these electrical apparatuses through voice-activation.

2. Description of Related Art

Most household electrical apparatuses, such as TV sets, DVD players, stereo systems, and air conditioners, are included with remote control means, such as an IR (infrared) remote controller, that allows the user to remotely turn on/off and control the operations of these electrical apparatuses.

One drawback to the conventional IR remote controllers, however, is that the user is nevertheless required to manually press control buttons provided on the panel. In addition, since many remote control functions require the user to repeatedly press the control buttons to execute. Therefore, the use of conventional remote controllers is quite laborious and inconvenient.

For a combined system of two or more electrical apparatuses, such as a combined system of a TV set and a DVD player, since these two electrical apparatuses each have their own dedicated remote controllers, it would be inconvenient for the user to use one remote controller to turn on the TV set and then the other remote controller to turn on the DVD player.

There are presently some types of voice-activated remote control devices available on the market that allow the user to remotely control the operations of TV or stereo systems through voice activation. One drawback to these voice-activated remote control devices, however, is that it would substantially become inoperable during the broadcast of TV or stereo programs since the broadcast sounds would make the voice recognition nearly impossible.

SUMMARY OF THE INVENTION

It is therefore an objective of this invention to provide a voice-activated remote control unit which allows the user to remotely turn on/off and control the operations of one or more electrical apparatuses through voice-activation without having to manually press buttons.

It is another objective of this invention to provide a voice-activated remote control unit which allows the user to remotely control the operations of two or more electrical apparatuses concurrently.

In accordance with the foregoing and other objectives, the invention proposes a voice-activated remote control unit.

Broadly recited, the voice-activated remote control unit of the invention comprises: (a) a microphone for picking up the user's voice command and converting the voice command into an analog voice signal; (b) a voice signal conversion unit for converting the output analog voice signal from the microphone into a digital voice signal, (c) a command code database for storing a predefined set of remote-control command codes and corresponding voice commands; (d) a voice recognition unit, which is capable of performing a voice recognition algorithm on the output digital voice signal from the voice signal conversion unit to thereby recognize the user's voice command, and which is further capable of retrieving the corresponding remote-control command code from the command code database; and (e) a wireless signal emitter, which is capable of modulating the retrieved remote-control command code from the command code database into a wireless signal and emitting the wireless signal to the electrical apparatuses to cause one or more of the electrical apparatuses to operate accordingly.

The voice-activated remote control devices of the invention is characterized by that it allows the user to turn on/off and control the operations of various types of electrical apparatuses entirely through voice activation without having to use hands.

Moreover, it is another characteristic feature of the invention that it includes an initial mute function that can set all the sound-reproduction functions of the electrical apparatuses being controlled temporarily to the mute mode at the start of the voice control, for the purpose of allowing an uninterfered reception of the user's voice command voice to make the voice recognition more accurately.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

A preferred embodiment of the voice-activated remote control unit according to the invention is disclosed in fill details in the following with reference to FIG. 1 and FIG. 2.

Figure 1:
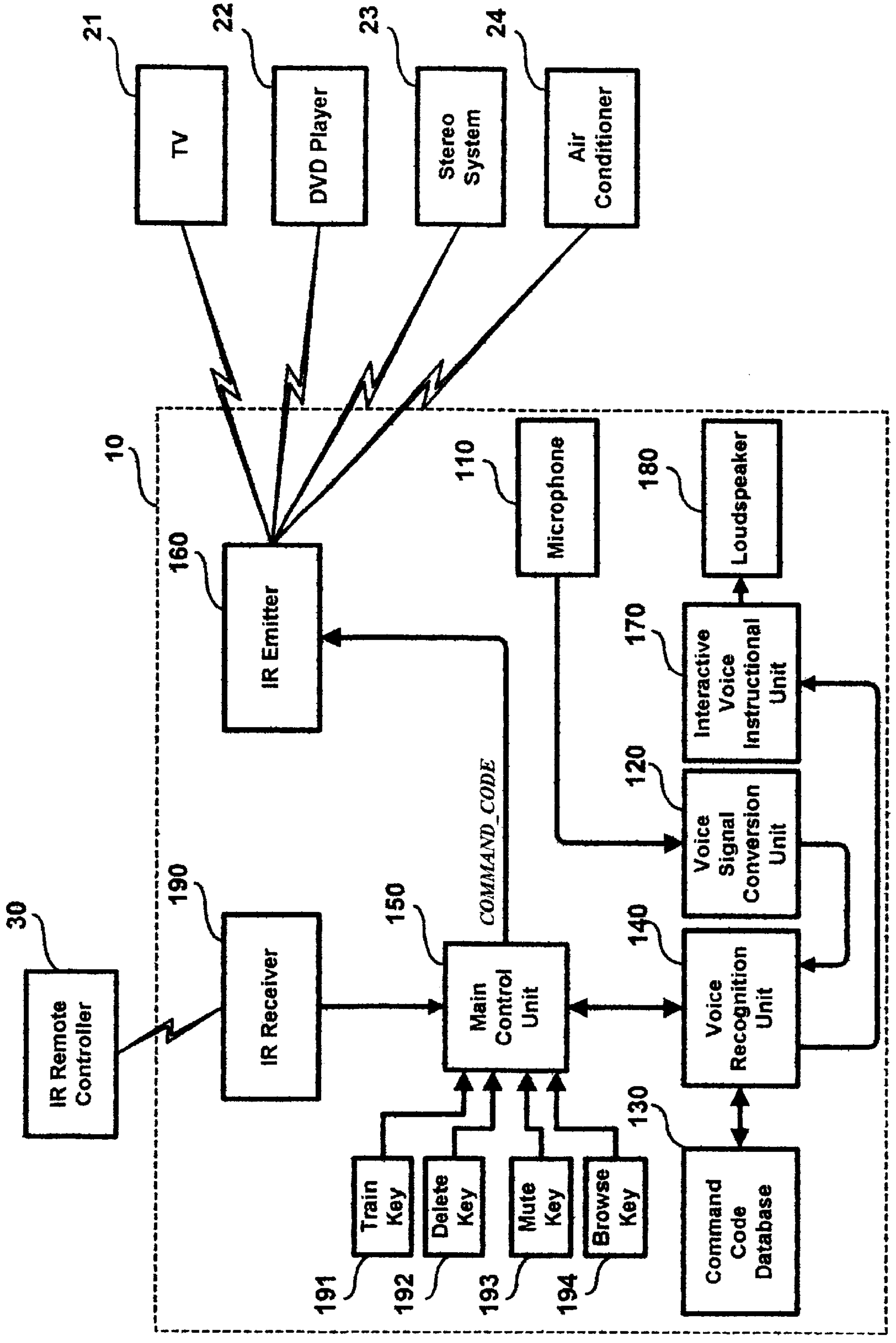
FIG. 1 is a block diagram showing the system architecture of the voice-activated remote control unit of the invention when used with a plurality of electrical apparatuses.

FIG. 1 is a block diagram showing the system architecture of the voice-activated remote control unit 10 of the invention when used with a plurality of electrical apparatuses, such as a TV set 21, a DVD player 22, a stereo system 23, and an air conditioner 24. Broadly speaking, however, the invention is suitable for use with any kind of electrical apparatus that includes remote control functions.

The voice-activated remote control unit 10 of the invention allows the user to remotely turn on/off and control the operations of the electrical apparatuses 21, 22, 23, 24 through voice-activation; i.e., the user needs just to utter a voice command against the voice-activated remote control unit 10 of the invention, and the voice-activated remote control unit 10 of the invention will be automatically activated to send out the corresponding IR signal to cause one or more of the electrical appliances 21, 22, 23, 24 to operate accordingly.

In order to prevent false activation by the user's daily chats, the voice-activated remote control unit 10 of the invention is included with an initialization function, which requires the user to utter a predefined initialization voice command, such as "REMOTE CONTROL" to set it to the standby mode. Otherwise, the voice-activated remote control unit 10 of the invention would be irresponsive to any voice commands. Afterwards, if the user wants to turn on both the TV set 21 and the air conditioner 24, he/she needs just to utter the corresponding voice commands, such as "TV ON" and "AIR CONDITIONER ON". After the TV set 21 is turned on, the user can further switch it to his/her desired channel and adjust the volume by saying, for example, "HBO" and "LOUDER", and the voice-activated remote control unit 10 of the invention will be activated to send out the corresponding IR signals to cause the TV set 21 to tune to the requested channel HBO and then turn up the volume by one step; and after the air conditioner 24 is turned on, the user can further set it to his/her desired temperature by saying, for example, "25 DEGREE", and the voice-activated remote control unit 10 of the invention will be activated to send out the corresponding IR signals to cause the air conditioner 24 to set the air-conditioned temperature to 25° C.

When the TV set 21 is turned on and broadcasting a program, the sounds from the broadcasting would degrade the sensitivity of the voice-recognition function of the voice-activated remote control unit 10 of the invention. Therefore, under this circumstance, the voice-activated remote control unit 10 of the invention may be unable to correctly recognize any user's subsequent voice commands. To solve this problem the voice-activated remote control unit 10 of the invention is further included with an initial mute function, which is automatically activated immediately after the initialization function is activated and is used to set the both the TV set 21 and the stereo system 23 to mute mode; and after the subsequent voice command input and recognition process is completed, the voice-activated remote control unit 10 of the invention will promptly send out a de-mute signal to cause the TV set 21 and the stereo system 23 to resume their preset broadcast volumes.

For a combined system of two or more electrical apparatuses, such as a combined system of the TV set 21 and the DVD player 22, the voice-activated remote control unit 10 of the invention is capable of turning on both the TV set 21 and the DVD player 22 by combining the two respective power-on command codes into a single remote-control command code to be activated by a single voice command by the user.

As shown in FIG. 1, the voice-activated remote control unit 10 of the invention comprises a microphone 110, a voice signal conversion unit 120, a command code database 130, a voice recognition unit 140, a main control unit 150, an IR signal emitter 160, an interactive voice instructional unit 170, a loudspeaker 180, an IR receiver 190, and a set of operation keys including a train key 191, a delete key 192, a mute key 193, and a browse key 194.

The microphone 110 is used to pick up the user's natural voice command and thereby produce an analog voice signal in electrical form. The voice signal conversion unit 120 is an analog-to-digital converter, which is capable of converting the output analog voice signal from the microphone 110 into a digital voice signal.

The command code database 130 is a data storage unit, such as flash memory, which is used to store a predefined set of remote-control command codes and their corresponding voice commands. These remote-control command codes can be inputted to and stored in the voice-activated remote control unit 10 of the invention in two ways: (1) by directly inputting the original code form, which can be obtained from the manufacturers of TV, DVD players, stereo systems, and air conditioners; and (2) by duplication of IR signals that are emitted from the dedicated IR remote controllers of TV, DVD players, stereo systems, and air conditioners. By the first method, all the remote-control command codes of the electrical apparatuses 21, 22, 23, 24 are obtained from their manufacturers, and then each remote-control command code is assigned to a unique number corresponding to a unique voice command. After this, the all the remote-control command codes together with their uniquely assigned numbers are stored into the command code database 130. By the second method, the voice-activated remote control unit 10 of the invention utilizes its built-in IR receiver 190 to receive all the IR signals from the dedicated IR remote controller 30 of each of the electrical apparatuses 21, 22, 23, 24, so that it can duplicate all the remote-control command codes that are dedicated to the electrical apparatuses 21, 22, 23, 24 and then store these codes in the command code database 130. Details steps of these two methods are conventional techniques, so description thereof will not be further detailed.

The voice recognition unit 140 is capable of performing a special voice recognition algorithm on the output digital voice signal from the voice signal conversion unit 120 to thereby recognize the user's voice command. The voice recognition unit 140 can be either a dedicated chip or a microprocessor with voice-recognition software or firmware. The voice recognition algorithm utilized by the voice recognition unit 140 is conventional technology so description thereof will not be further detailed.

The main control unit 150 can be either a microcontroller or a specific-purpose logic circuit, which is coupled to the IR signal emitter 160, the voice recognition unit 140, and the operation keys 191, 192, 193, 194 to control their operations.

The IR signal emitter 160 is capable of modulating the remote-control command code retrieved from the command code database 130 into an IR signal and then emitting the IR signal outwards to the electrical apparatuses 21, 22, 23, 24. Since these electrical apparatuses 21, 22, 23, 24 are typically located at various positions in a living room, it is desirable to allow the IR signal emitted from the IR signal emitter 160 to cover various directions and long-range positions.

Figure 2:
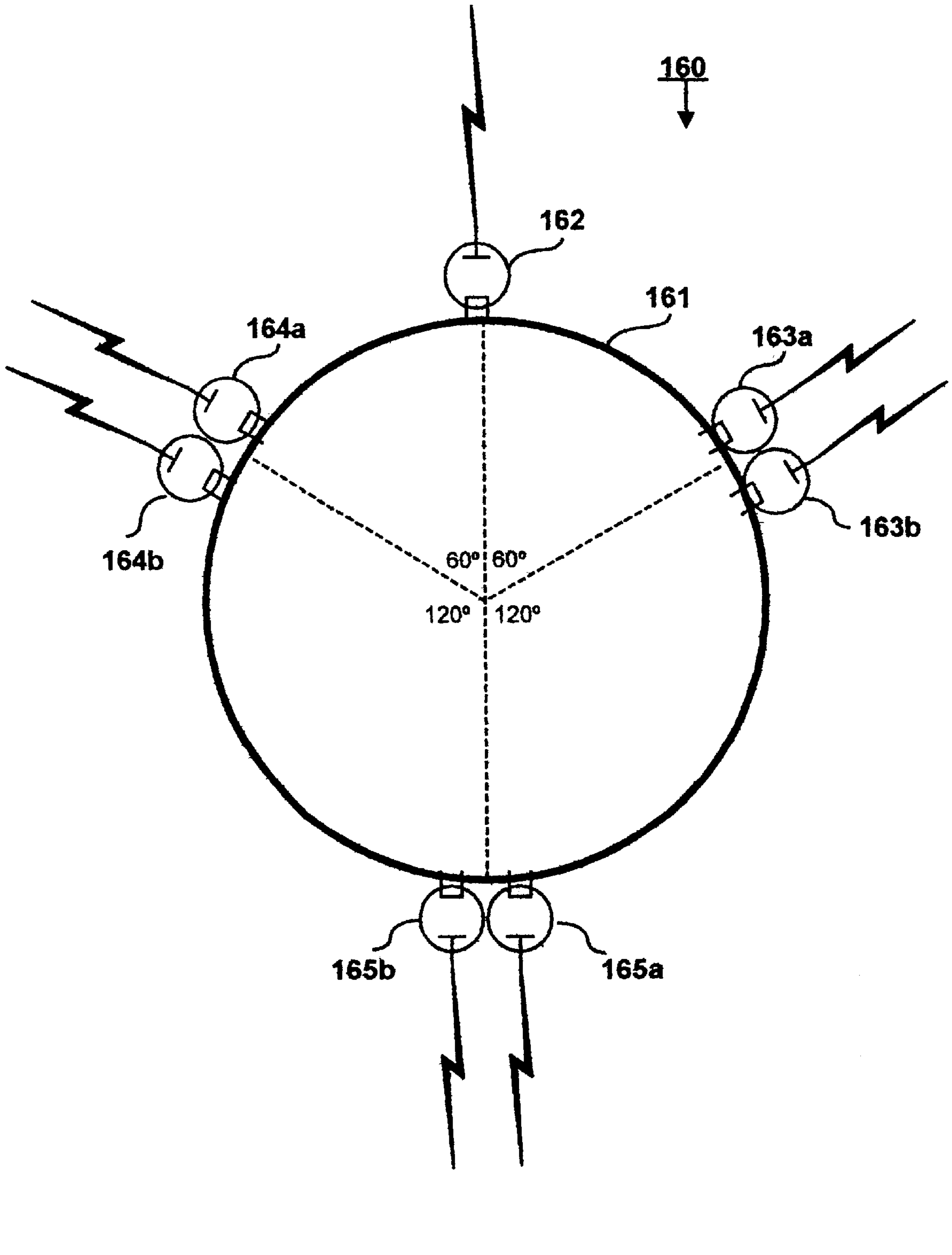
FIG. 2 is a schematic diagram showing the structure of the IR signal emitter utilized by the voice-activated remote control unit of the invention.

FIG. 2 is a schematic diagram showing a preferred embodiment of the IR signal emitter 160 that allows the emitted IR signal therefrom to cover various directions and long-range positions. As shown, the IR signal emitter 160 includes a circular panel 161 whose perimeter is arranged with a solitary IR diode 162, a first paired IR diode module (163*a*, 163*b*), a second paired IR diode module (164*a*, 164*b*), and a third paired IR diode module (165*a*, 165*b*); wherein the three paired IR diode modules (163*a*, 163*b*), (164*a*, 164*b*), (165*a*, 165*b*) are arranged at 120° angular intervals on the perimeter of the circular panel 161, while the solitary IR diode 162 is arranged between the first paired IR diode module (163*a*, 163*b*) and the second paired IR diode module (164*a*, 164*b*) and separated from each of them by an angular interval of 60°. Further, the three paired IR diode modules (163*a*, 163*b*), (164*a*, 164*b*), (165*a*, 165*b*) are each arranged in such a manner as to allow the two IR diodes therein to emit IR beams in parallel to each other. This allows the IR beams emitted from the solitary IR diode 162 and the three paired IR diode modules (163*a*, 163*b*), (164*a*, 164*b*), (165*a*, 165*b*) to substantially cover all directions and long-range positions. In practice, it is preferable to settle the IR signal emitter 160 in such a manner as to allow the solitary IR diode 162 to aim at the most-frequently used electrical apparatus, such as the TV set 21, so as to guarantee that the TV set 21 can always be remotely controlled by the voice-activated remote control unit 10 of the invention.

The interactive voice instructional unit 170 is used to store a predefined set of voice instructions which will be interactively broadcast to the user while he/she is input predefined settings to the voice-activated remote control unit 10 of the invention, such as "INPUT ERROR, PLEASE TRY AGAIN", "EXECUTION COMPLETED", and so on. The output of the interactive voice instructional unit 170 is coupled to the loudspeaker 180 where the voice instructions can be reproduced and broadcast to the user.

The train key 191 allows the user to train the voice-activated remote control unit 10 of the invention to learn his/her voice commands. For example, when the user wants to define "REMOTE CONTROLLER" as the voice command to activate the initialization function, he/she needs to use the train key 191 for the input purpose. The delete key 192 allows the user to delete any unwanted voice command that is already set but no longer needed. The mute key 193 allows the user to manually set all the electrical appliances 21, 22, 23, 24 to mute mode when he/she needs to input voice commands in a silent environment. The browse key 194 allows the user to browse through the currently stored voice commands in the voice-activated remote control unit 10 of the invention.

The voice-activated remote control unit 10 of the invention allows the user to remotely turn on/off and control the operations of one or more of the electrical apparatuses 21, 22, 23, 24 simply by uttering a voice command, and the voice-activated remote control unit 10 of the invention will be automatically activated to send out the corresponding remote-control command code in the form of IR signal. The IR signal will then cause one or more of the electrical apparatuses 21, 22, 23, 24 to operate in the manner specified by the voice command.

The microphone 110 is capable of picking up the user's voice command and convert it into an analog voice signal. The voice signal conversion unit 120 then converts the output analog voice signal from the microphone 110 into a digital voice signal and then transfers it to the voice recognition unit 140 for recognition.

The voice recognition unit 140 can perform a special voice recognition algorithm on the digital voice signal from the voice signal conversion unit 120 to thereby recognize the user's voice command. If the recognition is successful, the voice recognition unit 140 will subsequently retrieve the corresponding remote-control command code (represented by COMMAND_CODE) from the command code database 130 and then transfers it via the main control unit 150 to the IR signal emitter 160.

Subsequently at the IR signal emitter 160, the remote-control command code COMMAND_CODE is modulated into IR signal and then emitted outwards to the electrical apparatuses 21, 22, 23, 24 to cause one or more of the electrical apparatuses 21, 22, 23, 24 to operate accordingly.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A voice-activated remote control unit for use with one or more electrical apparatuses for a user to remotely turn on/off and control the operations of the electrical apparatuses, the voice-activated remote control unit comprising:

(a) a microphone for picking up the user's voice command and converting the voice command into an analog voice signal;

(b) a voice signal conversion unit converting the output analog voice signal from the microphone into a digital voice signal;

(c) a command code database storing a predefined set of remote-control command codes and corresponding voice commands;

(d) a voice recognition unit performing a voice recognition algorithm on the output digital voice signal from the voice signal conversion unit to thereby recognize the user's voice command and retrieve the corresponding remote-control command code from the command code database; and (e) an IR signal emitter modulating the retrieved remote-control command code from the command code database into an IR signal and emitting a wireless signal to the electrical apparatuses to cause one or more of the electrical apparatuses to operate accordingly, the IR signal emitter, including:

i) a circular panel;

ii) a group of paired IR diode modules including a first paired IR diode module, a second paired IR diode module, and a third paired IR diode module, the first, the second, and the third paired IR diode modules are arranged on a perimeter of the circular panel at 120° angular intervals, each pair of the group of paired IR diodes are arranged to emit IR beams that are parallel to each other; and iii) an IR diode arranged between the first paired IR diode module and the second paired IR diode module and separated from the first paired IR diode module and the second paired IR diode module by an angular interval of 60°;

(f) a mute device for remotely setting the electrical apparatuses to a mute mode at initialization of the voice-activated remote control unit; and (g) an initialization device for initializing the voice-activated remote control unit to a standby mode.

* * * * *